United States Patent [19]
Lin et al.

[11] Patent Number: 5,384,016
[45] Date of Patent: Jan. 24, 1995

[54] PROCESS FOR RECOVERING TUNGSTEN CARBIDE FROM CEMENTED TUNGSTEN CARBIDE SCRAPS BY SELECTIVE ELECTROLYSIS

[75] Inventors: Jing-Chie Lin; Jainn-Yuan Lin; Sheng-Long Lee, all of Chung-Li, Taiwan, Prov. of China

[73] Assignee: National Science Council, Taipei, Taiwan, Prov. of China

[21] Appl. No.: 150,376

[22] Filed: Nov. 10, 1993

[51] Int. Cl.$^6$ .................................................. C25F 1/00
[52] U.S. Cl. ..................................., 204/64 R; 204/86; 204/105 R; 204/141.5
[58] Field of Search .................. 204/86, 64 R, 105 R, 204/141.5

[56] References Cited

U.S. PATENT DOCUMENTS

| | | | |
|---|---|---|---|
| 3,595,484 | 7/1971 | Bernard et al. | 241/3 |
| 4,170,513 | 10/1979 | Piche | 156/656 |
| 4,234,333 | 11/1980 | Ghandehari et al. | 204/86 |
| 4,256,708 | 3/1981 | Quatrini | 423/61 |
| 5,021,133 | 6/1991 | Vanderpool et al. | 204/86 |

FOREIGN PATENT DOCUMENTS

0005877 12/1979 European Pat. Off. .

Primary Examiner—Kathryn Gorgos
Assistant Examiner—Arun S. Phasge
Attorney, Agent, or Firm—Ladas & Parry

[57] ABSTRACT

A process of recovering tungsten carbide from cemented tungsten carbide scraps by selective electrolysis is disclosed. A chelating agent is added to the electrolyte for complexing with tungsten ion to prevent passivation of tungsten carbide, and thus the dissolution rate of the cementing agent is increased.

9 Claims, 1 Drawing Sheet

PROCESS FOR RECOVERING TUNGSTEN CARBIDE FROM CEMENTED TUNGSTEN CARBIDE SCRAPS BY SELECTIVE ELECTROLYSIS

BACKGROUND OF THE INVENTION

1. Field of the Invention

The present invention relates to a process for recovering tungsten carbide from cemented tungsten carbide scraps, and more particularly to a process for recovering tungsten carbide by selective electrolysis in which a chelating agent is added to the electrolyte for complexing with tungsten ions produced during electrolysis to prevent passivation of tungsten carbide.

2. Description of the Prior Art

Due to its superior hardness, cemented tungsten carbide has been extensively used in the manufacture of cutting tools, drill, dies, and abrasion-resistant mechanical components. Since tungsten is not abundant, process for its recovery have drawn researchers' concern in many countries. Statistics reveal that recovered tungsten carbide comprises about 20% to 30% of the total supply, lowering the raw material cost by about 15% to 50%.

To date two approaches have been used to recover tungsten carbide scrap. The first approach involves reacting tungsten carbide scrap to form an intermediate, such as oxide, by a physical or chemical method, followed by reducing the oxide to pure tungsten. Examples of such methods include the conventional nitrate-melt-leaching process, high temperature oxidation, phosphoric acid leaching, chlorination and high potential electrolysis. The other approach involves the dissolution of a cementing agent to obtain a fine powder of tungsten carbide which can be directly used. Such methods include the molten zinc method, the cold stream flow method and low potential electrolysis.

The most frequently applied techniques are the molten zinc method and the cold stream flow method. According to the molten zinc method, the tungsten carbide scrap is heated to 900° C. with the introducton of argon gas, and is then vacuum distilled. The energy consumption is therefore great, about 4000 to 6000 kWh is required for one ton of tungsten carbide. The cold stream flow method includes heating cemented carbide scrap to a high temperature, injecting a high speed cold air flow to the scrap to break and separate the scrap, and then recovering tungsten carbide. This method also inevitably requires a lot of energy.

Recovering tungsten carbide from cemented carbides by electrolysis has been used since 1950. Such problems as complicated procedures and severe pollution encountered initially have been overcome recently with new developments in electrochemical technology. The electrolysis method has the following advantages: it saves energy, there is no pollution, the recovered product has high purity, and the investment for the equipment is low. For example, according to the high potential direct electrolysis method, tungsten carbide scrap, which serves as an anode, is electrolytically oxidized into anode slime of tungstic acid, and the cobalt cementing agent therein is thus dissolved in electrolyte to form cobalt ions. The anode slime of tungstic acid is then recovered by extraction or is reduced to tungsten metal. The cobalt can be recovered by electrolysis or by precipitation with the addition of oxalic acid. One disadvantage of this method is that the process for the recovery of tungsten carbide from anode slime of tungstic acid is complicated and therefore is not economical.

Nutzel and Kuhl in their EP 0 005 877 disclose a selective electrolysis process for recovering tungsten carbide from hard metal scrap containing the same. According to the process, the applied potential and energy consumption are low, the process and equipment for recovery are simple, and tungsten carbide can be directly recovered. According to Ghandehari, if a solution containing phosphoric acid is used as electrolyte in selective electrolysis for recovering tungsten carbide, the electrolysis can be carried out at a lower potential, and the efficiency for separating tungsten carbide and cobalt can be much improved (U.S. Pat. No. 4,234,333 and J. Electrochem. Soc. 127(1980):2144–2147). In technical papers by Dai Enzhong, "Reclamation of Cemented Carbide Scraps by Selective Electrolytic Dissolution Process (SEOP) at Recycling of Metalliferous Materials Conference, organized by the Institute of Mining & Metallurgy, 1990, 67–73, it is shown that tungsten carbide scrap will be subjected to passivation if the electrolysis is carried out in an acidic solution such as hydrochloric acid, nitric acid and sulfuric acid, thus causing the substantial reduction of dissolution rate. It is also indicated in these papers that if 2–3.5N HCl is used as electrolyte, and the electrolysis is carried out with the following conditions: tank voltage: 1.4–2.0 V, current density passing cathode: 140200 A/cm$^2$, electrolyte temperature: 30°–45° C., and flow rate of electrolyte: 0.8–1.2 liter/cm$^2$min, the electrolytic efficiency can be increased substantially. However, all of the above mentioned selective electrolysis methods have a disadvantage, that is, the current will gradually decrease due to the passivation of anode during the electrolysis process at a fixed potential. Additional potential should be gradually increased for maintaining a constant current. This will substantially affect the electrolysis efficiency.

SUMMARY OF THE INVENTION

An object of this invention is therefore to provide a process for recovering tungsten, carbide from cemented tungsten, carbide scrap by selective electrolysis with high efficiency.

According to an aspect of the invention, the electrolyte used is supplemented with a chelating agent for complexing with tungsten ions formed during electrolysis so as to prevent the passivation and thus improve the electrolysis efficiency.

Specifically, the process of the present invention includes the steps of: (a) immersing the cemented tungsten carbide scrap in an electrolyte having an anode and a cathode therein, the electrolyte being an acidic solution and including a chelating agent, and the cemented tungsten carbide scrap being connected to the anode; (b) applying a constant potential between the anode and the cathode to electrochemically and selectively dissolve at least a portion of the cementing agent without significant dissolution of the tungsten carbide; and (c) recovering the tungsten carbide from the electrolyte.

BRIEF DESCRIPTION OF THE DRAWING

The present invention can be more fully understood by reading the subsequent detailed description and examples with references made to the accompanying drawing, wherein.

DETAILED DESCRIPTION OF THE PREFERRED EMBODIMENT OF THE INVENTION

Figure 1:
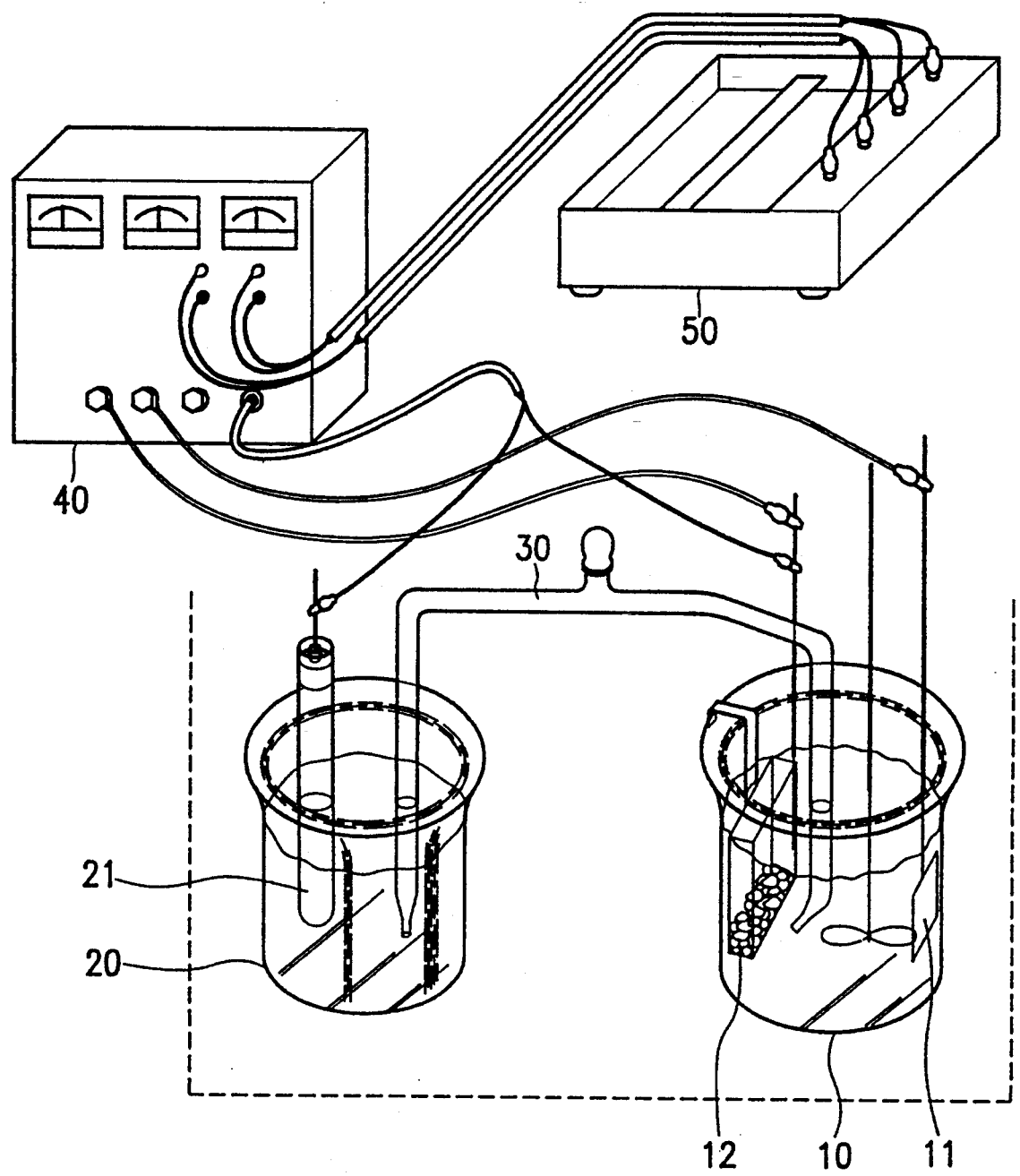
FIG. 1 is a diagram showing the apparatus of the selective electrolysis according to the preferred embodiment of the invention.

The cemented tungsten carbide alloy is conventionally prepared by mixing tungsten carbide powder with about 5 to 15 percent of cobalt or nickel powder which acts as a cementing agent when the product is sintered. The resultant alloy contains the tungsten carbide phase and the cementing agent phase, such as cobalt. Accordingly the structure thereof is in a heterogeneous state. Further, during the sintering process, the tungsten element in the tungsten carbide phase will become a solid solution with the cementing agent, and form an intermediate phase Co-W-C between the two phases.

When tungsten carbide scrap is subjected to selective electrolysis, the three phases in the tungsten carbide scrap respectively undergo the following reactions:

(1) cobalt cementing agent phase:

$$Co \rightarrow Co^{2+} + 2e^- \quad (a)$$

(2) tungsten carbide substrate phase:

outer layer: $WC + 2H_2O \rightarrow WO_2 + 4H^+ + C + 4e^-$ (b)

inner layer: WC is not reacted (3) Co-W-C intermediate phase:

$$Co \rightarrow Co^{2+} + 2e^- \quad (c)$$

$$WC + 2H_2O \rightarrow WO_2 + 4H^+ + 4e^- \quad (d)$$

$$2WO_2 + H_2O \rightarrow W_2O_5 + 2H^+ + 2e^- \quad (e)$$

$$W_2O_5 + H_2O \rightarrow 2WO_3 + 2H^+ + 2e^- \quad (f)$$

According to the above reactions, it is seen that the Co-W-C intermediate phase is reacted to form passive film of tungsten oxides such as $WO_2$, $W_2O_5$ and $WO_3$ when the cobalt is electrolysed and dissolved. In addition, the outer layer of tungsten carbide substrate itself also will be reacted to form a passive film such as $WO_2$. The formation of passive films is called passivation, which will hinder the dissolution of cobalt and affect the electrolysis efficiency.

Furthermore, it has been taught by Carvalho and Neves that citric acid can prevent the formation of tungsten oxide on the outer surface of calcium tungstate ore [Hydrometallurgy, 28, 45–64(1992)].

It has been found by the inventors of this invention from the study of Pourbaix diagrams of cobalt, tungsten and tungsten carbide that an acid media can facilitate the dissolution of the cementing agents during selective electrolysis of tungsten carbide alloy in aqueous solution.

It has also been found by the inventors that if a chelating agent, such as a citric acid, is added to an acid electrolyte during selective electrolysis, the intermediate phase will undergo a complexing reaction, on the anode, as indicated in the formula (g) below, to replace the oxidation reactions (d), (e) and (f).

$$Co\text{-}W\text{-}C + 4H_2O + nL \rightarrow Co^{2+} + WL_n^{(n-4)-} + CO_2 + 2H_2O \quad (g)$$

wherein L is referred to as citric acid.

In this way, the reactions of equations (d), (e) and (f) are inhibited, and a soluble complex $WL_n^{(n-4)-}$ is formed instead of a gummy passive film of tungsten oxide.

According to the present invention, the acid electrolytes suitable for use include aqueous solutions of hydrochloric acid, phosphoric acid, sulfuric acid, and nitric acid. The concentration of the acid electrolyte can vary from 0.1N to 5N. Using 1–3N hydrochloric acid is a preferable condition. Examples of the chelating agents other than citric acid include ammonium chloride, glycine, oxalic acid and ethylenediamine-N,N,N'N'-tetrachloric acid (EDTA) A preferred chelating agent is citric acid, and the preferred concentration thereof is 40 g/liter.

Note that according to the process of the invention, the potential and the electrolyte are determined in advance based on the test data obtained by applying anodic potentiodynamic polarization scanning on a tungsten carbide working electrode. Also, during the whole process of electrolysis, the potential must be kept constant and is usually controlled between 200 and 600 mV, preferably between 400 and 600 mV. The concentration of the electrolyte used can vary from 0.1 to 5N. Using 1–3N hydrochloric acid is a preferable condition.

PREFERRED EMBODIMENT OF THE PROCESS OF THE INVENTION

The preferred emdodiment of this invention is described as applied to the recovery of tungsten carbide from scraps of cemented tungsten carbide with a cobalt binder phase even though the preferred embodiment may be applied to the recovery of other metal carbide from scraps of cemented carbides thereof with binder phase of iron group metals other than cobalt. In accordance with the invention, the electrochemical dissolution of cobalt of cemented tungsten carbide scraps may be carried out in an electrolysis tank 10 illustrated in FIG. 1 in which an electrolyte is received. In the electrolysis tank 10 there is a cathode 11 and a anode basket 12 which is made of titanium material and has perforations in its side wall. The electrolyte in a reference electrode tank 20 in which saturated calomel electrode (SCE) 21 is used as the reference electrode is connected to the electrolyte of the electrolysis tank 10 with a salt bridge 30. The dc electric source is HA-321 Potentiostat 40 which can provide a constant potential. X-T Recorder 50 is used to record the relationship between current and time during the electrolysis process.

A 304 stainless steel plate of 9.9 cm×8.5 cm×0.1 cm and tungsten carbide scrap is used as the cathode 11 and the anode 12 respectively in the electrolysis process of this invention. The stainless steel plate has been polished with No. 400 emery paper, then polished with a series of larger numbered emery paper, finally with No. 1200 emery paper, and then wrapped with Teflon tape in order to expose an area of about 60 cm². The stainless steel plate and the tungsten carbide scrap are ultrasonically washed with acetone and distilled water separately, dried and weighed before use.

In using the apparatus to carry out the process of the invention, a 9.5 cm×9 cm×3 cm anode basket 12 is loaded with tungsten carbide scrap, and the stainless steel plates 11 are separately immersed into the electrolysis tank 10 with the electrolyte charged. In the side wall of the anode basket, about every 2–3 mm there is a perforation with diameter of 2 mm. A constant potential between 200 to 600 mV is then applied. The potential is expressed with respect to a saturated calomel electrode (SCE) 21 which is placed in the reference electrode tank 20. The two tanks 10 and 20 are both maintained at a constant temperature of 25° C. The whole electrolysis process is allowed to proceed for about 24 hours with constant stirring rotated at 140 rpm.

After the electrolysis is completed, the residual tungsten carbide and the stainless steel plate are washed, dried and weighed.

The following specific examples are intended to demonstrate this invention more fully without acting as a limitation upon its scope, since numerous modifications and variations will be apparent to those skilled in the art.

EXAMPLE 1

The apparatus as shown in FIG. 1 was used and 44.3 g of S20CM tungsten carbide scrap having 20% cobalt was placed into a solution of 1N hydrochloric acid. The electrolysis process is carried out for about 24 hours at constant potential of 600 mV (vs SCE). The concentration of tungsten and cobalt dissolved was analyzed by Inductively Coupled Plasma Atomic Emission Spectrophotometry (ICP-AES). The ratio of cobalt dissolved and the weight of cobalt plated on the cathode were also measured. The results are shown in Table 1.

A second run was conducted in a similar manner except that 51.2 g of tungsten carbide scrap was placed into a solution of 1N hydrochloric acid containing 40 g/liter citric acid. The results are also shown in Table 1.

From the data shown in Table 1, it is seen that with citric acid added, the ratio of cobalt dissolved and the concentration of tungsten dissolved are both much enhanced, respectively from 49.4% to 80.7% and from 9 mg/liter to 536 mg/liter. Therefore, the addition of citric acid can prevent the passivation of tungsten carbide, thus speeding up the dissolution rate of cobalt, and facilitating the plating out of the cobalt ions in the electrolyte solution.

EXAMPLE 2

The same procedure as described in Example 1 was used, except that 59.3 g and 59 g of S20CM tungsten carbide scrap were separately placed into a solution of 1N hydrochloric acid and a solution of 1N hydrochloric acid containing 40 g/liter citric acid, and the constant potential was 400 mV (vs SCE). The results are shown in Table 1. It is seen that with citric acid added, the ratio of cobalt dissolved and the concentration of tungsten dissolved are both much enhanced, respectively from 59.0% to 79.5% and from 38 mg/liter to 687 mg/liter.

EXAMPLE 3

The same procedure as described in Example 1 was employed, except that 50.6 g and 51.2 g of W22CB tungsten carbide scrap having 20% cobalt was separately placed into a solution of 1N hydrochloric acid and a solution of 1N hydrochloric acid containing 40 g/liter citric acid and the constant potential was 200 mV (vs SCE). The results are shown in Table 1. It is seen that with citric acid added, the ratio of cobalt dissolved and the concentration of tungsten dissolved are both much enhanced, respectively from 31.0% to 49.0% and from 45 mg/liter to 498 mg/liter.

From the above three examples, it is concluded that when the electrolysis is conducted at constant potential, citric acid can prevent the passivation of tungsten carbide, promote the dissolution rate of cobalt, and facilitate the plating out of the cobalt ion in the electrolyte solution. The dissolution rate is higher at about 400 mV to 600 mV (vs SCE) of applied potential than at 200 mV thereof.

EXAMPLE 4

The same procedure as described in Example 1 was employed, except that 50.4 g and 50.2 g of S20CM tungsten carbide scrap were separately placed into a solution of 2N phosphoric acid and a solution of 2N phosphoric acid containing 20 g/liter ammonium chloride, and the constant potential was 400 mV (vs SCE). The results are shown in Table 1. It is seen that with ammonium chloride added, the ratio of cobalt dissolved and the concentration of tungsten dissolved are both much enhanced, respectively from 20.5% to 35.5% and from 266 mg/liter to 399 mg/liter. Therefore, ammonium chloride can prevent the passivation of tungsten carbide. However, the cobalt plated on the cathode is not plentiful.

Comparing Example 2 and Example 4, it is seen that more tungsten and cobalt is dissolved when using 1N hydrochloric acid (with or without citric acid added) than using 2N phosphoric acid. The dissolution rate of cobalt is much increased when citric acid is added to hydrochloric acid.

TABLE 1

| Exp. No. | Applied potential (mV vs SCE) | Electrolyte | Scrap (g) | Conc. of W dissolved (mg/l) | Conc. of Co dissolved (mg/l) | Ratio of Co dissolved (%) | Co plated on the cathode (g) |
|---|---|---|---|---|---|---|---|
| 1 | 600 | 1N HCl | 44.3 | 9 | 9.0 | 49.4 | 0.14 |
|   |     | 1N HCl + 40 g/l CA | 51.2 | 539 | 17.1 | 80.7 | 0.24 |
| 2 | 400 | 1N HCl | 59.3 | 38 | 14.1 | 59.0 | 0.11 |
|   |     | 1N HCl + 40 g/l CA | 59.0 | 687 | 19.1 | 79.5 | 0.21 |
| 3 | 200 | 1N HCl | 50.6 | 45 | 6.7 | 31.0 | 0.23 |
|   |     | 1N HCl + 40 g/l CA | 51.2 | 498 | 10.6 | 49.0 | 0.35 |
| 4 | 400 | 2N H3PO4 | 50.4 | 266 | 4.5 | 20.5 | 0.01 |
|   |     | 2N H3PO4 + 20 g/l NH4Cl | 50.2 | 399 | 7.8 | 35.5 | 0.03 |

CA = citric acid

What is claimed is:

1. A process for recovering tungsten carbide from cemented tungsten carbide scrap having a cementing agent, comprising the steps of:

(a) immersing the cemented tungsten carbide scrap in an electrolyte having an anode and a cathode therein, the electrolyte being an acidic solution and including a chelating agent, and the cemented tungsten carbide scrap being connected to the anode;

(b) applying a constant potential between the anode and the cathode to electrochemically and selectively dissolve at least a portion of the cementing agent without significant dissolution of the tungsten carbide and;

(c) recovering the tungsten carbide from the electrolyte.

2. The process as claimed in claim 1, wherein the electrolyte is selected from the group consisting of hydrochloric acid, phosphoric acid, sulfuric acid and nitric acid.

3. The process as claimed in claim 1, wherein the chelating agent is selected from the group consisting of citric acid, ammonium chloride, glycine, oxalic acid and ethylenediamine-N,N,N',N'-tetrachloric acid (EDTA).

4. The process as claimed in claim 1, wherein the electrolyte is hydrochloric acid and the chelating agent is citric acid.

5. The process as claimed in claim 4, wherein the concentration of the hydrochloric acid is between 1 and 3N.

6. The process as claimed in claim 4, wherein the concentration of the citric acid is 40 g/liter.

7. The process as claimed in claim 1, wherein the potential is maintained between 200 and 600 mV.

8. The process as claimed in claim 7, wherein the potential is maintained between 400 and 600 mV.

9. The process as claimed in claim 1, wherein the electrolyte is phosphoric acid and the chelating agent is ammonium chloride.

* * * * *